United States Patent [19]
Gougouyan

[11] Patent Number: 5,232,022
[45] Date of Patent: Aug. 3, 1993

[54] PAIR OF CERAMIC DISKS FOR A MIXER FAUCET AND MIXER FAUCET COMPRISING SAME

[75] Inventor: Yves Gougouyan, Paris, France

[73] Assignee: C.I.C.E. S.A.

[21] Appl. No.: 908,308

[22] Filed: Jul. 2, 1992

[30] Foreign Application Priority Data

Jul. 4, 1991 [FR] France ................. 91 08393

[51] Int. Cl.⁵ ............................................. F16K 11/06
[52] U.S. Cl. ............................ 137/625.4; 137/625.17
[58] Field of Search ............ 137/625.17, 625.4, 625.41

[56] References Cited

U.S. PATENT DOCUMENTS 3,987,819 10/1976 Scheuermann ............ 137/625.41 X
4,856,556  8/1989 Mennigman ................ 137/625.4
5,080,134  1/1992 Orlandi ..................... 137/625.4 X

FOREIGN PATENT DOCUMENTS 3309339 9/1984 Fed. Rep. of Germany .
2574894 6/1986 France .
2590643 5/1987 France .

*Primary Examiner*—John Rivell
*Attorney, Agent, or Firm*—Remy J. VanOphem

[57] ABSTRACT

A pair of ceramic disks for mixer faucets includes a fixed disk and a smaller mobile disk adapted to slide on the fixed disk within given limits. The fixed disk has on one side a bearing surface adapted to lie against the mobile disk and has two feed openings and one outlet opening through it. The bearing surface of the fixed disk has a closed main rim around the three openings and at least one depression in the surface through only part of the thickness of the fixed disk. In any position of the mobile disk relative to the fixed disk, the bearing surface of the mobile disk bears on the rim all around the depression. The bearing surface further includes an inner rim which in the closed position of the mobile disk isolates the outlet opening from the feed openings.

15 Claims, 6 Drawing Sheets

PAIR OF CERAMIC DISKS FOR A MIXER FAUCET AND MIXER FAUCET COMPRISING SAME

BACKGROUND OF THE INVENTION

1. Field of the Invention

The invention concerns the geometry of the contacting surfaces of ceramic disks which slide on each other in a mixer faucet.

2. Description of the Prior Art

A mixer faucet includes, inside an external body, an internal enclosure usually called a cartridge of which one surface is formed by a fixed ceramic disk connected in a fluid-tight way to three passages: two water feed passages, one for hot water and one for cold water, and an outlet passage for water at an intermediate temperature. A smaller mobile disk slides and rotates on the fixed disk. Movement is imparted to it by a cartridge mechanism according to the orientation of an external operating lever for use by a user.

The fixed disk has two closely spaced feed orifices or slots connected to the respective feed passages and an outlet orifice or slot connected to the outlet passage, the disk having a geometry which is symmetrical relative to a plane of symmetry which intersects the disk between the feed orifices and through the outlet orifice. The mobile disk includes an oblong opening, usually in the shape of the digit 8 or keyhole-shape. It also has a plane of symmetry. On movement in translation of the mobile disk along the fixed disk when the planes of symmetry are coincident the oblong opening of the mobile disk can intercept only the single outlet orifice or cover equal parts of the two feed orifices. Rotation of the mobile disk by an angle usually in the order of ±60° has the result that the oblong opening intercepts the outlet orifices, or even only one feed orifice when only hot water or only cold water is required.

The greatest care is exercised in ensuring a complete seal between the contacting surfaces of the disks combined with a moderate level of friction so that the forces required to operate the external lever are smooth and moderate.

However, mixer faucets with ceramic disks have two major drawbacks. The force required to operate them increases as they age; and the mechanism may seize up if not used for a considerable time (this phenomenon is in fact random and results in an erratic operating torque).

Two types of solution have been considered and/or used to overcome these drawbacks in the past: using a film of grease between the two plates, or reducing the surface area of contact between the plates.

It is obvious that other friction problems arise within the cartridge mechanism, but the invention is not directed to these problems and they will not be explained further here.

The grease is usually a hydrophobic silicone grease applied in a layer 1 to 5 $\mu$m thick. The layer of grease has a number of drawbacks.

The layer of grease is unstable and tends to be eliminated by scraping, washing or crushing during operation of the faucet. Because its viscosity is dependent on temperature, the operating torque is not constant; also, elimination of the grease film is accelerated in the area through which the hot water passes. The film of grease traps all kinds of impurities present in the water, especially limescale. These impurities form a sludge which can disrupt or even eliminate the lubricating properties of the grease. The grease (in particular the soap from which it is constituted) is an ill-defined product likely to react with water, and if it becomes too thin, the film of grease has the opposite effect to that required and can contribute to increasing the operating torque. Also, deterioration (reaction with the surrounding medium, oxidation, etc) of the grease can cause the jamming previously referred to, through the formation of a kind of "glue".

When it comes to reducing the area of the bearing surfaces, that is the surfaces in contact, the solution most widely used is to substitute for the mobile disk cylindrical members whose edges rest on the second disk, which makes the system stable. This presupposes a special mechanism, requiring a particular faucet geometry. Also, the problem very often arises of guiding the cylindrical members to maintain them in contact with the disk. This results in an imbalance and, therefore, in premature wearing of the mechanism. This mechanism can operate without lubrication, however.

A second solution is widely employed, usually in association with lubrication as a safety measure. It consists in modifying the periphery of one of the two disks, usually the fixed disk, so as to limit on this disk the interface of contact with the other disk to the area inside a circle slightly larger than that intercepting the three openings in the disk: hot water feed, cold water feed and water outlet.

However, this solution has the drawback that it still requires lubrication (with the aforementioned drawbacks) all the more so in that the projection of the mobile part relative to the contact surface of the fixed part has a scraper effect which speeds up the elimination of the grease.

The current approach to avoiding the aforementioned drawbacks is to use new materials for the disk.

An object of the invention is to alleviate the aforementioned drawbacks using conventional materials but without requiring the presence of grease, enabling the operating torque to remain the same over long periods and without causing premature wear or aging.

SUMMARY OF THE INVENTION

The present invention resides in a pair of ceramic disks for mixer faucets including a fixed disk adapted to be fixed relative to the faucet and a mobile disk smaller than the fixed disk and adapted to slide and rotate on the fixed disk within defined limits of relative displacement. The fixed disk includes on one side a bearing surface which is adapted to lie against the mobile disk and through which pass two water feed openings and a water outlet opening adapted to be connected on the side opposite the bearing surface to hot and cold water feed passages and an outlet passage for water at an intermediate temperature. The feed openings are disposed one on each side of a reference plane perpendicular to the fixed disk and passing through the outlet opening. The mobile disk has a bearing surface adapted to be pressed into water-tight contact with the bearing surface of the fixed disk. An oblong recess in the bearing surface of the mobile disk is adapted, depending on the position of the mobile disk on the fixed disk, to intercept only the outlet opening in a so-called closed position or to intercept the outlet opening and one and/or the other of the feed openings, at least partially, wherein the bearing surface of the mobile disk is continuous from the opening to a peripheral edge of the mobile disk. The bearing surface of the fixed disk includes a closed main rim extending around the three openings and at least one depression formed in the surface through part only of the thickness of the fixed disk, the bearing surface of the mobile disk bearing in any position relative to the fixed disk on the rim all around the depression. The bearing surface of the fixed disk further includes an inner rim which in the closed position of the mobile disk isolates the outlet opening from the feed openings.

The invention, therefore, creates one or more recesses on the surface of the fixed disk in the area inside the circle intercepting the three water passages. The main advantage is a very significant reduction (in practice 50% or greater) of the bearing surface area of the fixed disks, which favors the evacuation of debris, significantly reduces the risk of jamming and, if jamming/binding occurs, minimizing the forces needed to release the parts. There is, therefore, virtually no risk of breakage through jamming.

It will be understood that this solution goes against the conventional wisdom of the person skilled in the art who would look systematically to avoid anything that might resemble the onset of leakage between the facing surfaces of the fixed and mobile disks. However, the invention specifies conditions which maintain under all circumstances efficient sealing to avoid any leakage towards the periphery of the disk.

According to preferred features of the invention the bearing surface of the fixed disk further includes a secondary inner rim surrounding the outlet opening, and the inner rim extends around each feed opening and is contiguous with the main rim.

The internal rims combined with the main rim have the advantage of producing a water reserve whereby the disks can be lubricated without using any grease. The reserve can be totally sealed off in the closed position of the faucet so that the water contained in it is unable to evaporate and prevents drying of the plates and the resulting sticking phenomena. The rims around the feed openings isolate the hot and cold water inlets and the rim around the outlet opening is sufficient to trap a quantity of water.

According to optionally combinable preferred features of the invention the peripheral edge of the bearing surface of the mobile disk is inscribed in a circle of diameter d, movement of the mobile disk on the fixed disk is limited to an area at least approximately of diameter D and the main rim is circular with an inside diameter $\emptyset$ satisfying the condition:

$$d_1 \leq \emptyset < 2d - D$$

where $d_1$ is the diameter of the smallest circle containing the feed and outlet openings. The diameter D is the diameter of the fixed disk. The main rim has a diameter of at least $d + 1.5$ mm, and a width between 2 and 15% the mean length of the fixed disk and is at least 1.5 mm wide.

The bearing surface further includes ribs projecting laterally towards the outside of the main rim.

The depression formed in the fixed disk is a single depression and is between 0.5 and 1.5 mm deep and its depth is not more than 25% the thickness of the fixed disk (in practice the upper limit on this percentage is set by considerations of feasibility of industrial manufacture and is in the order of 25%).

The plane of symmetry constitutes a plane of symmetry for the fixed disk and the opening in the mobile disk passes through only part of its thickness.

Objects, features and advantages of the invention will emerge from the following description given by way of non-limiting example with reference to the appended drawings.

DETAILED DESCRIPTION OF THE PREFERRED EMBODIMENT

Figure 1:
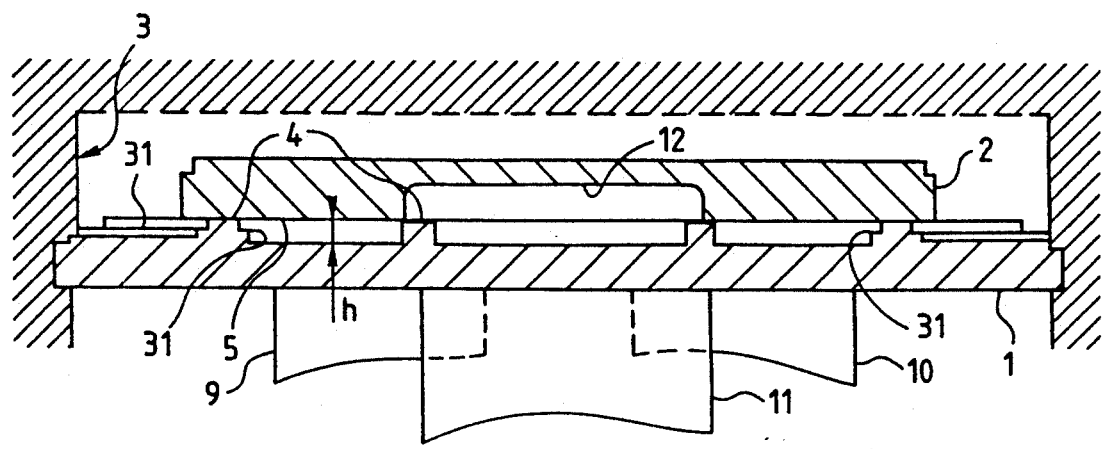
FIG. 1 is a view of a stack of disks from FIGS. 2 and 3 in diametral cross section on the line I—I in those figures.

FIG. 1 shows a pair of substantially circular ceramic disks 1 and 2 adapted to be incorporated in a mixer faucet of which only the interior enclosure or cartridge 3 is shown in a highly diagrammatic form.

One disk 1 is designed to be fixed relative to the faucet and the other, smaller disk 2 is designed to slide on the fixed disk and to rotate about an axis parallel to a reference axis perpendicular to the disks. Movement of the mobile disk on the fixed disk is confined to the interior of a space that is in practice determined by the cross section of the fixed disk.

Figure 2:
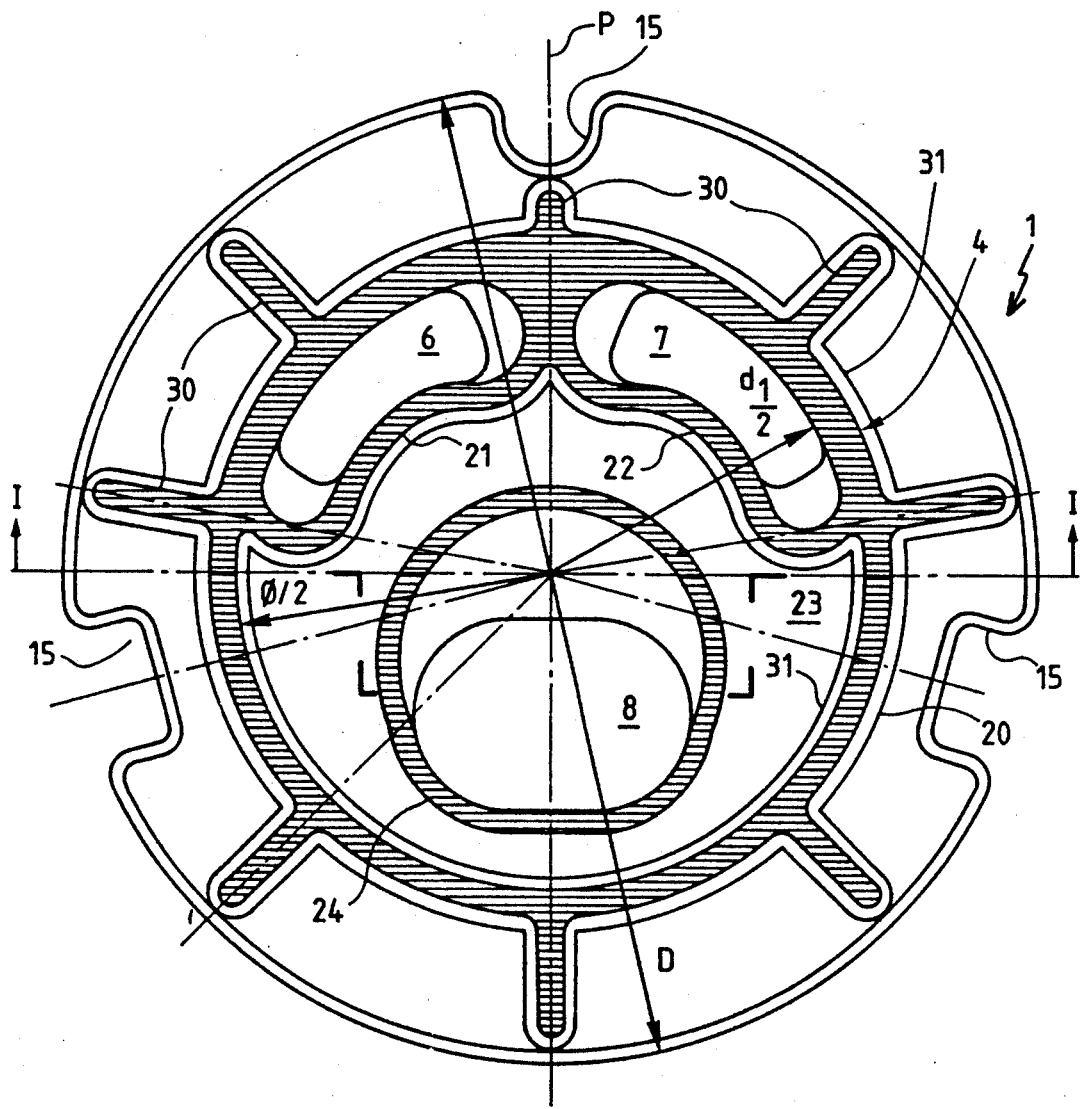
FIG. 2 is a top view of the fixed disk of the stack from FIG. 1, the shading indicating the bearing surface against which the mobile disk is supplied.

The fixed disk 1 (FIG. 2) has on one side a bearing surface 4 adapted to lie against the mobile disk 2.

Figure 3:
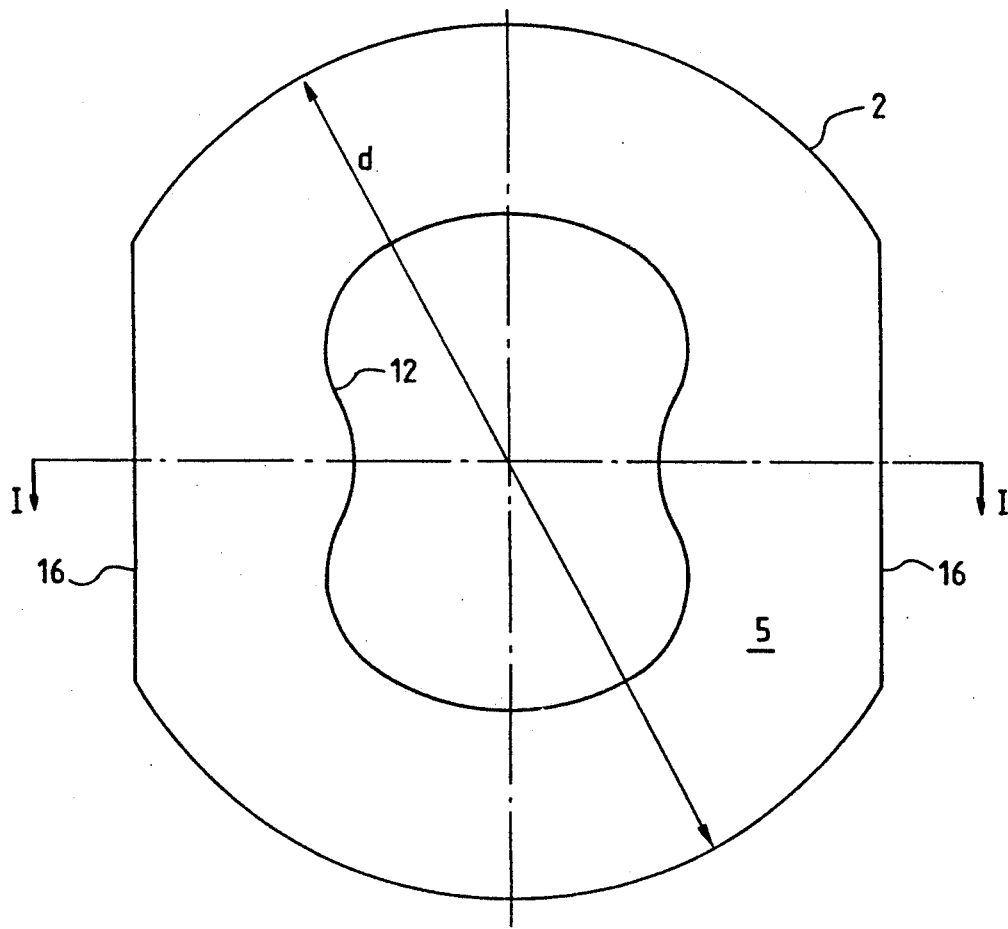
FIG. 3 is a bottom view of the mobile disk of the stack from FIG. 1.

The mobile disk 2 (FIG. 3) has to this end a bearing surface 5 adapted to be passed by any appropriate known means (not shown) into water-tight contact with the bearing surface 4.

There are three openings 6 through 8 through the bearing surface 4, namely two feed openings 6 and 7 and an outlet opening 8. On the opposite side to the bearing surface the feed openings 6 and 7 are joined respectively to hot and cold water feed passages 9 and 10 and the outlet opening 8 is joined to an outlet passage 11 for water at an intermediate temperature. Note that the openings 6 through 8 widen in the direction from the passages towards the mobile disk.

The feed openings 6 and 7 are disposed one on each side of the reference plane P perpendicular to the fixed disk 1 and intersecting the outlet opening 8. The plane P is a plane of symmetry for the fixed disk.

The mobile disk 2 includes an oblong recess 12 which passes through only part of its thickness (i.e. it is a blind hole).

Figure 4:
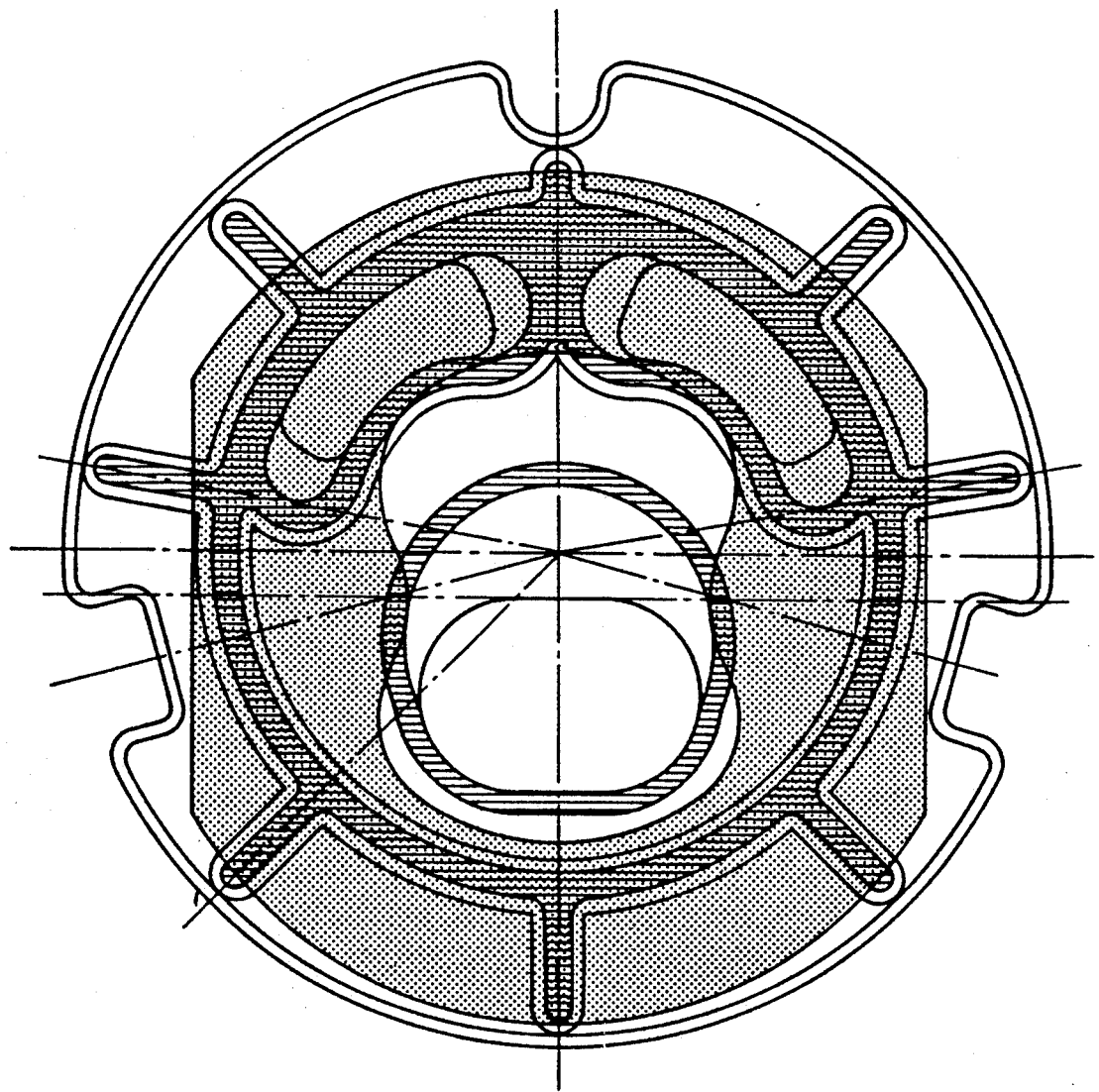
FIG. 4 is a top view of the stack of disks from FIG. 1 in a position preventing any flow of water, the shaded area representing the bearing surface through which the mobile disk rests on the fixed disk.
Figure 5:
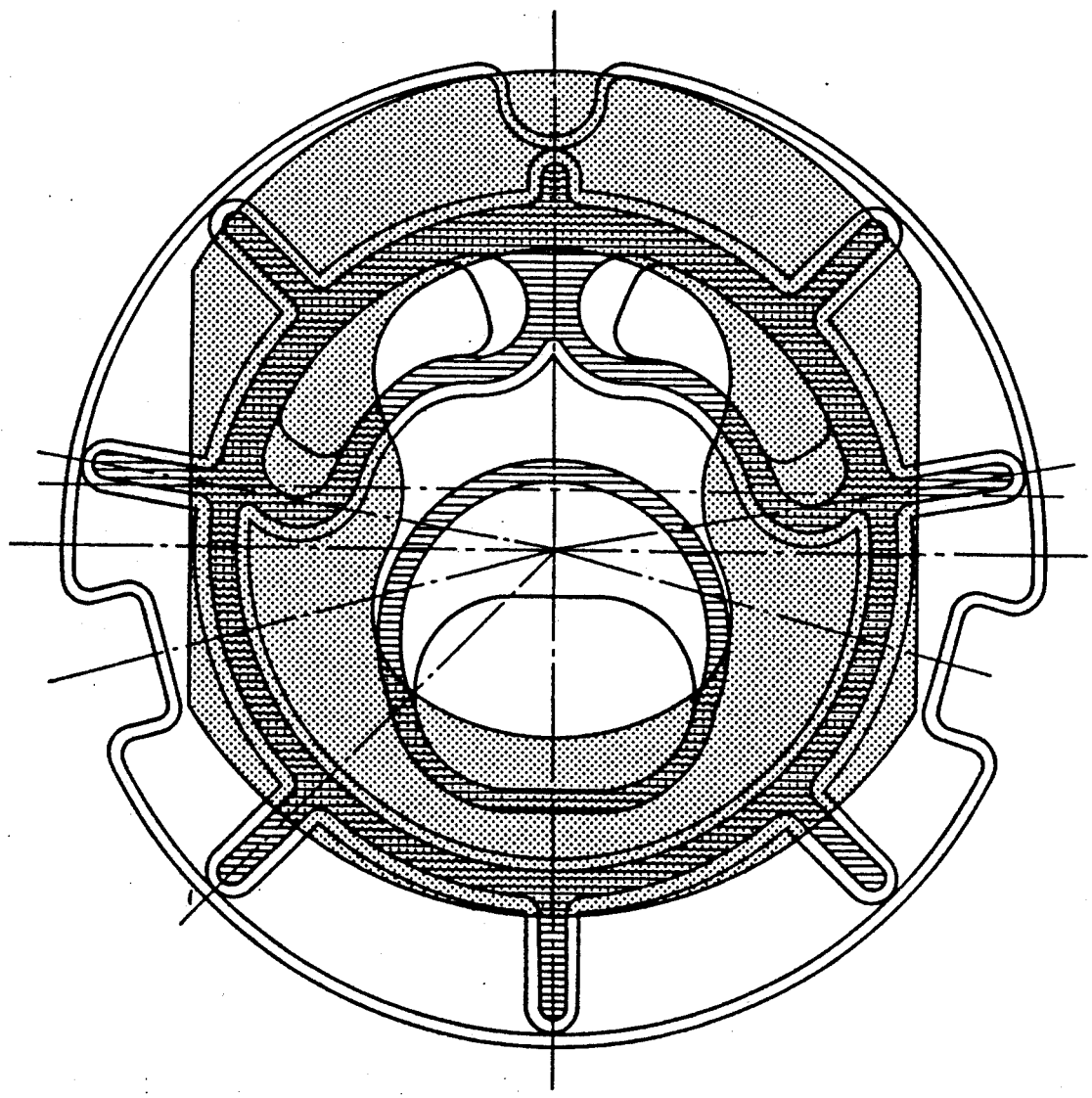
FIG. 5 is another view of the stack in a position in which the incoming flows of water are mixed in substantially equal proportions.
Figure 6:
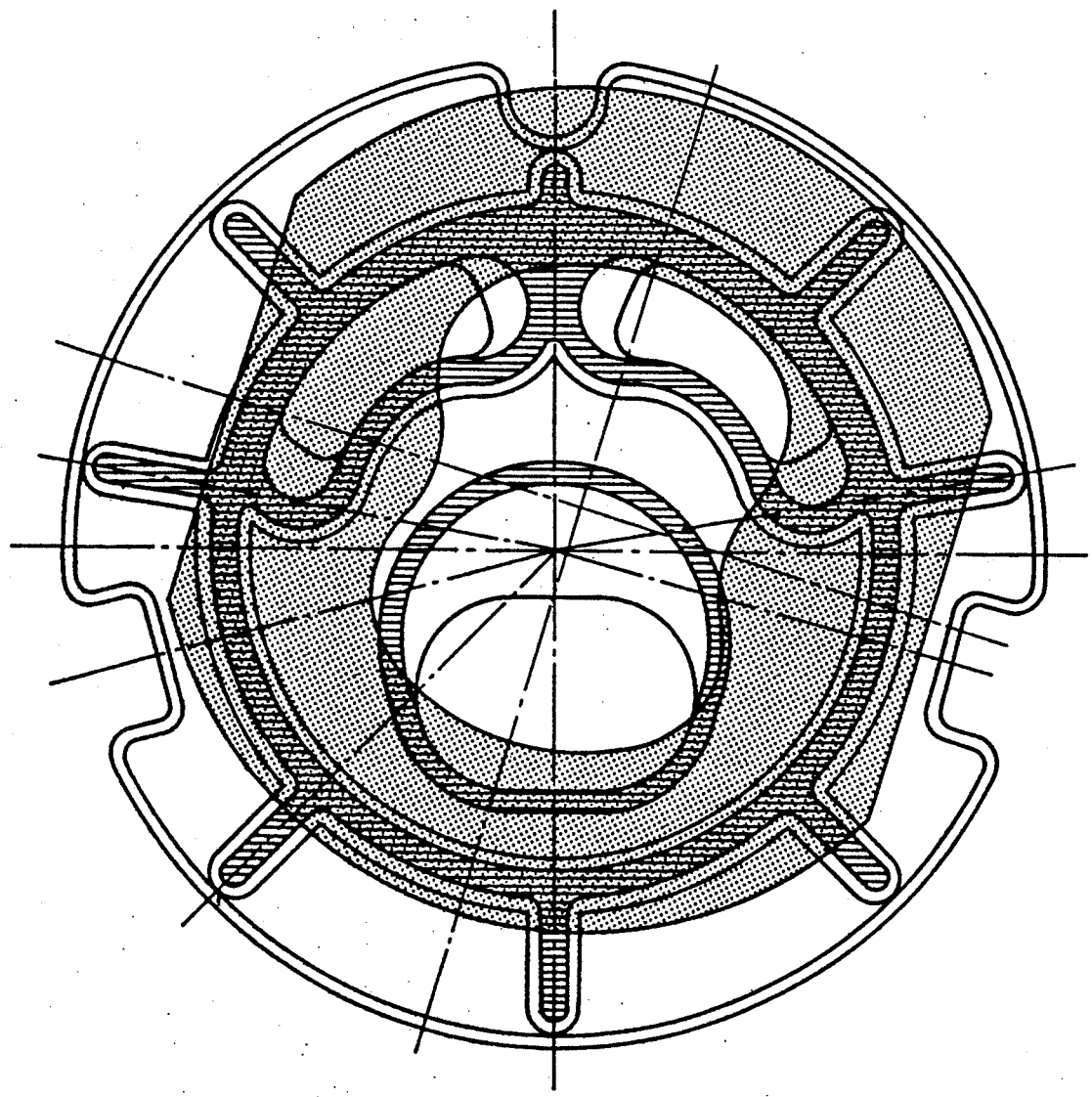
FIG. 6 is another view of the stack in a position in which the incoming flows of water are mixed in very different proportions.

Movement is imparted to the mobile disk by a mechanism (not shown) coupled to an operating lever (also not shown) external to the faucet between a so-called closed position (see FIG. 4) in which the oblong recess 12 intercepts only the outlet opening of the fixed disk 5 and various open positions either symmetrical to the plane P (see FIG. 5) in which case the flows of hot and cold water are mixed in equal proportions or asymmetric to the plane (see FIG. 6 for example) in which case one of the flows (in this example the flow from the opening 7) dominates.

The disks 1 and 2 are generally circular, with notches 15 or flats 16 for locating them relative to the cartridge (fixed disk) or to the cartridge mechanism (mobile disk).

The bearing surface 4 of the fixed disk is not continuous. The bearing surface 5 of the mobile disk extends continuously from the oblong recess 12 to the peripheral edge 17 of the mobile disk.

The bearing surface 4 includes a main rim 20 closed upon itself extending all around the three openings and such that in any position of the mobile disk the bearing surface 5 rests on this rim all around the three openings 6 through 8.

The bearing surface 4 further includes an inner rim adapted in the closed position of the mobile disk (see FIG. 4) to isolate the feed openings 6 and 7 from the oblong recess 12 and, therefore, from the outlet opening 8. The inner rim is advantageously formed by two rims 21 and 22 isolated from each other or contiguous and each surrounding one or the other of the feed openings 6 and 7 so as to isolate them in the closed position of the mobile disk.

In the example shown the two rims 21 and 22 are contiguous to each other and to the main rim 20.

In an alternative embodiment (not shown) the rims 21 and 22 are isolated from each other and from the main rim 20.

In a further embodiment (also not shown) the inside rim is reduced to a single rim around the two openings 6 and 7, either on its own or conjointly with the main rim.

Inside the main rim 20 and opposite the openings 6 and 7 relative to the inside rim is provided a shallow depression 23 of depth h between 0.3 and 1.5 mm, preferably between 0.6 and 1 mm, and preferably not more than 25% of the thickness of the fixed disk so as not to degrade its mechanical properties. This upper limit is also imposed by the feasibility of industrial manufacture of a disk of this kind.

The bearing surface 4 preferably further includes a rim 24 surrounding the outlet opening 8 so as to form a lip for the depression 23 which can, therefore, constitute a reserve of water in the closed position (the disks are usually horizontal). In the example shown the rim 24 is isolated from the main rim 20.

The rims and in particular the main rim preferably have a width between 5 and 15% of the diameter of the fixed disk, in practice 1.5 mm or greater.

In this example there is a single depression 23; in an alternative embodiment (not shown) it is formed in a number of parts forming independent water reserves.

To strengthen the support for the mobile disk the bearing surface 4 advantageously includes radial ribs 30.

The various rims and the ribs 30 are advantageously bordered by intermediate depth lips 31.

To be effective the depression must have a large surface area and its dimensions are determined according to the following principles:

let D denote the diameter of the fixed disk;
let d denote the diameter of the mobile disk; and
let $d_1$ denote the diameter of the minimum circle containing the three water passage openings.

The inside diameter $\phi$ of the bearing surface 4 must be between:

$$\phi < 2d - D$$

$$\phi < d_1 \text{ (in water feed area)}$$

In practice, $\phi$ is chosen to be approximately equal to $d_1 + 1.5$ mm. It is clear that for this principle to operate there is the requirement that $d_1 < 2d - D$. However, the provision of the openings filled with water between the two disks remains within the scope of the invention.

With the previous condition satisfied, the periphery of the depression 23 is defined by the rim 20 with a bearing surface around the perimeter of the water passages. The rim can have a width of approximately 0.6 to 1 mm.

It is of course necessary to join the shapes or contours of the openings so that, in the non-contiguous areas of the openings, the depression is delimited by proportions of circles concentric with the outside circle of the bearing surface (circle or more simply perimeter).

Figure 8:
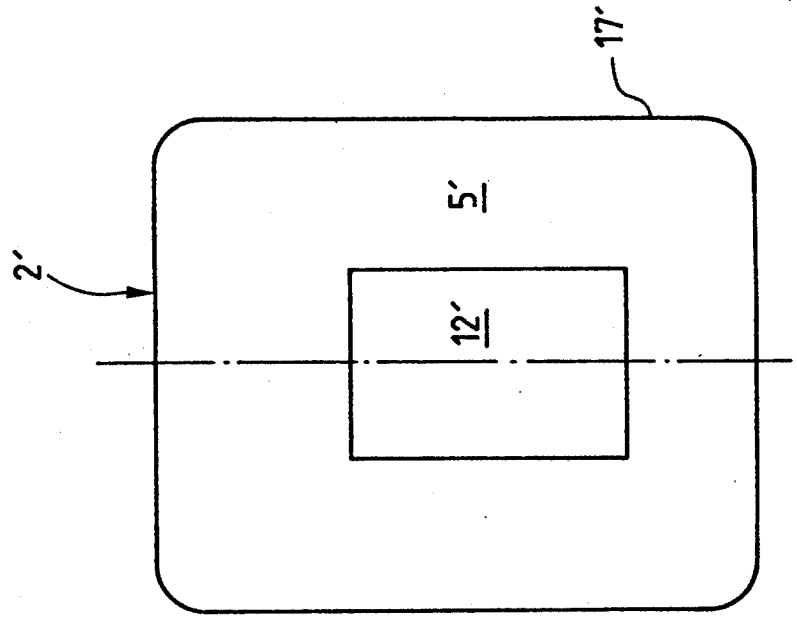
FIG. 8 is a bottom view of a rectangular mobile disk that can be associated with the fixed disk of FIG. 7.
Figure 7:
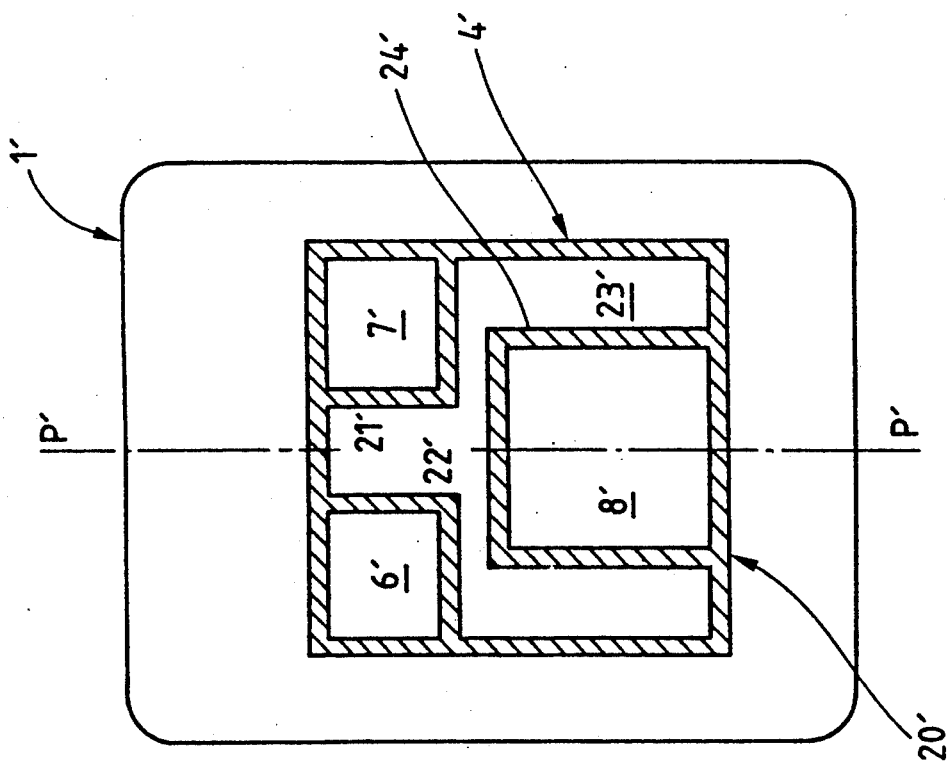
FIG. 7 is a highly diagrammatic top view of a rectangular fixed disk.

FIGS. 7 and 8 show in a highly diagrammatic way an alternative embodiment in which the disks are rectangular rather than circular.

Parts analogous to those of FIGS. 1 through 6 are identified by the same reference number "primed".

It goes without saying that the previous description has been given by way of non-limiting example only and that numerous variants may be put forward by one skilled in the art without departing from the scope of the invention.

There is claimed:

1. A pair of ceramic disks for a mixer faucet, said pair of ceramic disks comprising:

a fixed disk having first and second inlet openings and an outlet opening therethrough, said first and second inlet openings being on opposite sides of a reference plane perpendicular to said fixed disk, said reference plane intersecting said outlet opening, said fixed disk having an outlet closed rim surrounding said first and second inlet openings and said outlet opening so as to define a recess in said fixed disk, said outer closed rim defining a first bearing surface of said fixed disk, said fixed disk having an inner closed rim separating said outlet opening from said first and second inlet openings, said inner closed rim defining a second bearing surface of said fixed disk; and a mobile disk abutting said first and second bearing surfaces of said fixed disk to form a substantially water-tight seal therewith, said mobile disk being slidable and rotatable relative to said fixed disk, said mobile disk having means for selectively forming a passage between said outlet opening and said first and second inlet openings, said passage means intercepting only said outlet opening in a closed position of said mobile disk, said passage means intercepting both said outlet opening and at least one of said first and second inlet openings in an open position of said mobile disk.

2. A pair of ceramic disks according to claim 1 wherein said fixed disk further comprises a second inner closed rim surrounding said outlet opening.

3. A pair of ceramic disks according to claim 1 wherein said inner closed rim surrounds said first and second inlet openings.

4. A pair of ceramic disks according to claim 2 wherein said inner closed rim is contiguous with said outer closed rim.

5. A pair of ceramic disks according to claim 1 wherein said mobile disk has a peripheral edge inscribed in a circle of diameter d, movement of said mobile disk on said fixed disk is limited to an area having a diameter of at least about diameter D and said outer closed rim is substantially circular with an inside diameter $\phi$ satisfying the conditions:

$$d_1 \leq \phi < 2d - D$$

where $d_1$ is the diameter of the smallest circle circumscribing said first and second inlet openings and said outlet opening.

6. A pair of ceramic disks according to claim 5 wherein said diameter D is the diameter of said fixed disk.

7. A pair of ceramic disks according to claim 5 wherein said outer closed rim has a diameter of at least about $d_1 + 1.5$ mm.

8. A pair of ceramic disks according to claim 1 wherein said outer closed rim has a width of between about 2 and about 15% of the diameter of said fixed disk.

9. A pair of ceramic disks according to claim 8 wherein said outer closed rim is at least about 1.5 mm wide.

10. A pair of ceramic disks according to claim 1 wherein said first bearing surface further comprises ribs projecting radially outward from said outer closed rim.

11. A pair of ceramic disks according to claim 1 wherein said recess in said fixed disk is a single depression circumscribed by said first bearing surface.

12. A pair of ceramic disks according to claim 1 wherein said recess is between about 0.5 and about 1.5 mm deep and has a depth of not more than about 25% of the thickness of said fixed disk.

13. A pair of ceramic disks according to claim 1 wherein said reference plane defines a line of symmetry of said fixed disk.

14. A pair of ceramic disks according to claim 1 wherein said passages means in said mobile disk is an oblong recess.

15. A pair of ceramic disks for a mixer faucet, said pair of ceramic disks comprising:

a fixed disk having first and second inlet openings and an outlet opening therethrough, said first and second inlet openings being on opposite sides of a line of symmetry of said fixed disk, said line of symmetry substantially bisecting said outlet opening, said fixed disk having an outer closed rim surrounding said first and second inlet openings and said outlet opening so as to define a recess in said fixed disk, said fixed disk having an inner closed rim contiguous with said outer closed rim and isolating said outlet opening from said first and second inlet openings, said outer closed rim and said inner closed rim defining a first bearing surface of said fixed disk, said fixed disk having a second inner closed rim circumscribing said outlet opening, said second inner closed rim defining a second bearing surface of said fixed disk; and a mobile disk having a bearing surface abutting said first and second bearing surfaces of said fixed disk to form a substantially water-tight seal therewith, said mobile disk being slidable and rotatable relative to said fixed disk, said mobile disk having an oblong recess formed in said bearing surfaces so as to define a passage between said outlet opening and said first and second inlet openings, said oblong recess intercepting only said outlet opening in a closed position of said mobile disk, said oblong recess intercepting both said outlet opening and at least one of said first and second inlet openings in an open position of said mobile disk;

whereby said outer closed rim and said inner closed rim define a reservoir with said second inner closed rim between said fixed disk and said mobile disk.

* * * * *

UNITED STATES PATENT AND TRADEMARK OFFICE
CERTIFICATE OF CORRECTION

PATENT NO. : 5,232,022
DATED : 8/3/93
INVENTOR(S) : Yves Gougouyan

It is certified that error appears in the above-indentified patent and that said Letters Patent is hereby corrected as shown below:

Column 3, line 58, delete "d" and insert ---- $d_1$ ----.

Column 6, line 10, delete "<" and insert ---- $\geq$ ----.

Column 6, line 45, delete "outlet" and insert ---- outer ----.

Column 8, line 5, delete "passages" and insert ---- passage ----.

Column 8, line 31, delete "surfaces" and insert ---- surface ----.

Signed and Sealed this

Seventh Day of June, 1994

BRUCE LEHMAN

Attest:

Attesting Officer

Commissioner of Patents and Trademarks